United States Patent
Yang et al.

(10) Patent No.: US 11,469,634 B2
(45) Date of Patent: Oct. 11, 2022

(54) ROTOR COOLING SYSTEM WITH INCREASED COOLANT RESIDENCE TIME FOR ELECTRIC MOTOR

(71) Applicant: GM GLOBAL TECHNOLOGY OPERATIONS LLC, Detroit, MI (US)

(72) Inventors: Xiaofeng Yang, Troy, MI (US); Wei Zeng, Oakland Township, MI (US); Lei Hao, Troy, MI (US); Srihari K. Gangaraj, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 540 days.

(21) Appl. No.: 16/737,434

(22) Filed: Jan. 8, 2020

(65) Prior Publication Data

US 2021/0211008 A1  Jul. 8, 2021

(51) Int. Cl.
| | |
|---|---|
| H02K 1/32 | (2006.01) |
| H02K 9/19 | (2006.01) |
| H02K 9/193 | (2006.01) |
| F04C 29/02 | (2006.01) |
| F04C 29/00 | (2006.01) |

(52) U.S. Cl.
CPC ........... *H02K 1/32* (2013.01); *F04C 29/0078* (2013.01); *F04C 29/023* (2013.01); *H02K 9/19* (2013.01); *H02K 9/193* (2013.01)

(58) Field of Classification Search
CPC ............ H02K 1/32; H02K 9/19; H02K 9/193; H02K 9/197
USPC ...................... 310/54, 58, 59, 60 A, 60 R, 61
See application file for complete search history.

(56) References Cited

U.S. PATENT DOCUMENTS

| 9,712,021 B2 * | 7/2017 | Watanabe ................ H02K 9/19 |
| 2021/0363993 A1 * | 11/2021 | Ueda ........................ H02K 1/32 |

\* cited by examiner

*Primary Examiner* — Quyen P Leung
*Assistant Examiner* — Minki Chang
(74) *Attorney, Agent, or Firm* — Vivacqua Crane PLLC

(57) ABSTRACT

A permanent magnet electric motor includes a shaft extending along a longitudinal axis, wherein the shaft defines a shaft jacket extending along a first direction, a rotor mounted on the shaft, a stator disposed about the rotor. The rotor defines a plurality of longitudinal channels each with the shaft jacket. The longitudinal channels are part of a rotor jacket. The rotor jacket includes a plurality of inlets fluidly interconnecting the shaft jacket and the plurality of the longitudinal channels. The rotor jacket includes an inner edge and an outer edge opposite the inner edge. The rotor jacket includes a plurality of outlets each in fluid communication with the plurality of longitudinal channels. Each of the outlets is closer to the inner edge than to the outer edge of the rotor jacket.

20 Claims, 11 Drawing Sheets

ROTOR COOLING SYSTEM WITH INCREASED COOLANT RESIDENCE TIME FOR ELECTRIC MOTOR

INTRODUCTION

The present disclosure relates generally to electric motors and, more particularly, to a rotor cooling system for increasing coolant residence time for electric motors.

High speed electric motors may experience high temperatures in their rotors. Therefore, it is desirable to cool the rotors of high-speed electric motors. Current cooling methods, such as injecting coolant onto an end ring of the electric motor, result in the coolant being blown away. As a result, the coolant is not spread effectively on the end ring of the electric motor, resulting in ineffective heat transfer between the coolant and the electric motor.

SUMMARY

It is therefore desirable to develop a way to cool the rotor temperature while achieving it coolant mass dynamic balance. The present disclosure describes a way to decrease the rotor temperature of an electric motor by flowing coolant into the shaft and then into the rotor. To do so, the rotor of the electric motor includes a rotor jacket. The rotor jacket is disposed inside of the rotor and includes longitudinal channels close to the permanent magnets of the electric motor. In addition, the rotor jacket includes inlets for allowing the coolant to flow into the longitudinal channels. The rotor jacket further includes outlets located close to the jacket inner radius on the rotor ends to reduce the temperature of the rotor and winding. The outlets located close to the jacket inner radius help retain the coolant running inwards toward the shaft to increase coolant residence time and heat transfer. The longitudinal channels of the rotor jacket may have a trapezoidal shape in order to be closer to the magnets of the rotor, thereby maximizing heat reduction in the rotor. The outlet arrangement enhances coolant balancing and spreading for winding cooling.

In an aspect of the present disclosure, the permanent magnet electric motor includes a shaft extending along a longitudinal axis. The shaft defines a shaft jacket extending along a first direction. The first direction is parallel to the longitudinal axis. The shaft jacket is sized to receive a coolant, and the shaft is rotatable about the longitudinal axis. The permanent magnet electric motor further includes a rotor mounted on the shaft such that the rotor is rotatable concomitantly with the shaft about the longitudinal axis. The permanent magnet electric motor further includes a stator disposed about the rotor, wherein the stator remains stationary relative to the rotor. The rotor defines a plurality of longitudinal channels extending in the first direction. The first direction is parallel to the longitudinal axis, each of the plurality of longitudinal channels is in fluid communication with the shaft jacket to allow the coolant to flow from the shaft jacket to the longitudinal channel to cool the rotor. The longitudinal channels are part of a rotor jacket. The rotor jacket further includes a plurality of inlets fluidly interconnecting the shaft jacket and the plurality of the longitudinal channels to allow the coolant to flow from the shaft jacket to the plurality of longitudinal channels through the plurality of inlets. The rotor jacket includes an inner edge and an outer edge opposite the inner edge. The inner edge is spaced from the outer edge along a second direction. The second direction is perpendicular to the first direction. The rotor jacket further includes a plurality of outlets each in fluid communication with the plurality of longitudinal channels to allow the coolant to flow from the plurality of longitudinal channels to the plurality of outlets to exit the rotor. Each of the plurality of outlets is closer to the inner edge than to the outer edge of the rotor jacket to hinder the coolant from flowing back into the plurality of inlets toward the shaft jacket, thereby maximizing a time that the coolant resides inside the plurality of longitudinal channels and maximizing heat transfer between the rotor and the coolant.

In another aspect of the present disclosure, the rotor includes a plurality of permanent magnets. Each of the longitudinal channels has a trapezoidal shape to maximize heat transfer between the coolant flowing through the plurality of longitudinal channels and the plurality of permanent magnets.

The rotor jacket includes a first longitudinal end and a second longitudinal end along the first direction. The outlets are located at the first longitudinal end and the second longitudinal end.

In another aspect of the present disclosure, the inlets are located at a longitudinal midpoint between the first longitudinal end and the second longitudinal end to evenly distribute the cooling in the plurality of longitudinal channels. The distance from the first longitudinal end to the longitudinal midpoint is equal to a distance from the longitudinal midpoint to the second longitudinal end.

In an aspect of the present disclosure, the rotor defines a plurality of interconnection channels. Each of the interconnection channels directly interconnects an adjacent pair of the plurality of longitudinal channels to direct the coolant from one of the plurality of longitudinal channels to another one of the plurality of the longitudinal channels. The shaft jacket may be entirely disposed inside the shaft. Each of the longitudinal channels may be entirely disposed inside the rotor. Each of the interconnection channels may be entirely disposed inside the rotor.

In an aspect of the present disclosure, the permanent magnet electric motor may further include a first end ring and a second end ring opposite the first end ring. The rotor includes a first rotor end and a second rotor end opposite to the first rotor end. The first rotor end may be spaced apart from the second rotor end along the first direction. The first end ring may be attached to the rotor at the first rotor end. The second end ring may be attached to the rotor at the second rotor end.

In an aspect of the present disclosure, the permanent magnet electric motor includes a plurality of pole pieces, each of the plurality of longitudinal channels has a first lateral end and a second lateral end opposite the first lateral end, each of the plurality of longitudinal channels is shaped as an arc extending from the first lateral end to the second lateral end, each of the plurality of longitudinal channels has a central angle, the central angle of each of the plurality of longitudinal channels is subtended by the arc extending from the first lateral end to the second lateral end, and the central angle of each of the plurality of longitudinal channels is less than $$\frac{360°}{M} \times 0.95 \text{ degrees,}$$

and M is a number of pole pieces.

In an aspect of the present application, the rotor has a center. The rotor has an innermost rotor radius. The innermost rotor radius is defined from the center of the rotor to an innermost rotor edge of the rotor. Each of the longitudinal channels defines an innermost longitudinal-channel end and an outermost longitudinal-channel end opposite the innermost longitudinal-channel end. The outermost longitudinal-channel end of each of the longitudinal channels is farther from the center of the rotor than the innermost longitudinal-channel end of each of the plurality of longitudinal channels. Each of the channels defines an innermost longitudinal-channel radius and an outermost longitudinal-channel radius. The innermost longitudinal-channel radius is defined from the center of the rotor to the innermost longitudinal-channel end. The innermost longitudinal-channel radius is equal to or greater than: r+5 millimeters, where r is the innermost rotor radius in millimeters.

In an aspect of the present disclosure, the rotor defines an outermost rotor edge. The outermost rotor edge is opposite to the innermost rotor edge. The outermost rotor edge is farther from the center of the rotor than the innermost rotor edge. The rotor has an outermost rotor radius. The outermost rotor radius is defined from the center of the rotor to the outermost rotor edge of the rotor, each of the plurality of longitudinal channels defines an outermost longitudinal-channel radius. The outermost longitudinal-channel radius is defined from the center of the rotor to the outermost longitudinal-channel end of each of the plurality of longitudinal channels. The outermost longitudinal-channel radius is equal to or less than: R−10 millimeters, where R is the outermost rotor radius in millimeters.

In an aspect of the present disclosure, each of the plurality of longitudinal channels has a longitudinal-channel midpoint between the first lateral end and the second lateral end. The first longitudinal-channel distance from the first lateral end to the longitudinal-channel midpoint is equal to the second longitudinal-channel distance from the second lateral end to the longitudinal-channel midpoint. Each of the interconnection channels has an interconnection-channel midpoint. Each of the interconnection channels includes a first side-end and a second side-end opposite the first side-end. The first interconnection-channel distance from the first side-end to the interconnection-channel midpoint is equal to the second interconnection-channel distance from the second side-end to the interconnection-channel midpoint. Each of the interconnection channels is shaped as an arc extending from the first side-end to the second side-end. Each of the interconnection channels is angularly offset from an adjacent one of the plurality of longitudinal channels by an offset angle. The offset angle is defined from the longitudinal-channel midpoint of one of the longitudinal channels to the interconnection-channel midpoint of the adjacent one of the plurality of interconnection channels. The offset angle may be equal to:

$$\frac{360°}{M} \times 0.5,$$

where M is the number of pole pieces.

In an aspect of the present disclosure, each of the interconnection channels defines an innermost interconnection-channel end and an outermost interconnection-channel end that is opposite the innermost interconnection-channel end. The outermost interconnection-channel end of each of the plurality of interconnection channels is farther from the center of the rotor than the innermost interconnection-channel end of each of the plurality of interconnection channels, each of the plurality of interconnection channels defines an innermost interconnection-channel radius and an outermost interconnection-channel radius, the innermost interconnection-channel radius is defined from the center of the rotor to the innermost interconnection-channel end, the innermost interconnection-channel radius is equal to or greater than: r+5 millimeters, where r is the innermost rotor radius in millimeters.

In an aspect of the present disclosure, each of the plurality of interconnection channels defines an outermost interconnection-channel radius, the outermost interconnection-channel radius is defined from the center of the rotor to the outermost interconnection-channel end of each of the plurality of interconnection channels, and the outermost longitudinal-channel radius is equal to or less than: R−10 millimeters, where R is the outermost rotor radius in millimeters.

In an aspect of the present disclosure, each of the interconnection channels is shaped as an arc extending from the first side-end to the second side-end, each of the plurality of interconnection channels has a central angle. The central angle of each of the plurality of interconnection channels is subtended by the arc extending from the first side-end to the second side-end, and the central angle of each of the plurality of interconnection channels is less than $$\frac{360°}{M} \times 0.95 \text{ degrees},$$

and M is a number of pole pieces.

In an aspect of the present disclosure, the rotor defines a plurality of permanent-magnet slots. Each of the permanent-magnet slots is sized to receive a permanent magnet. Each of the permanent-magnet slots has an innermost slot point. The innermost slot point is disposed at a location of each of the permanent-magnet slots that is closest to the center of the rotor. The distance from the outermost interconnection-channel end to the innermost slot point is between three and eight millimeters.

In an aspect of the present disclosure, each of the permanent magnet slots defines a lateral slot end. Each of the longitudinal channels has an outermost side channel edge. The distance from the outermost side channel edge to the lateral slot end is greater than three millimeters.

In an aspect of the present disclosure, wherein each of the plurality of interconnection channels has a first end and a second end opposite the first end. The first end of each of the plurality of interconnection channels is spaced apart from the second end of each of the plurality of interconnection channels along the first direction. Each of the plurality of interconnection has a length defined from the first end to the second end of each of the plurality of interconnection channels. The length of the each of the plurality of interconnection channels is between three millimeters and five millimeters.

In an aspect of the present disclosure, the distance between the outer edge of the rotor jacket to the inner outlet edge of the outlet has an upper limit and a lower limit, the upper limit is equal to the innermost rotor radius plus 0.3 times h, where h is a distance from inner edge to the outer edge of the rotor jacket, and the lower limit is equal to the innermost rotor radius plus zero times h.

BRIEF DESCRIPTION OF THE DRAWINGS

The present disclosure will be described in conjunction with the following figures, wherein like numerals denote like elements.

Figure 21:
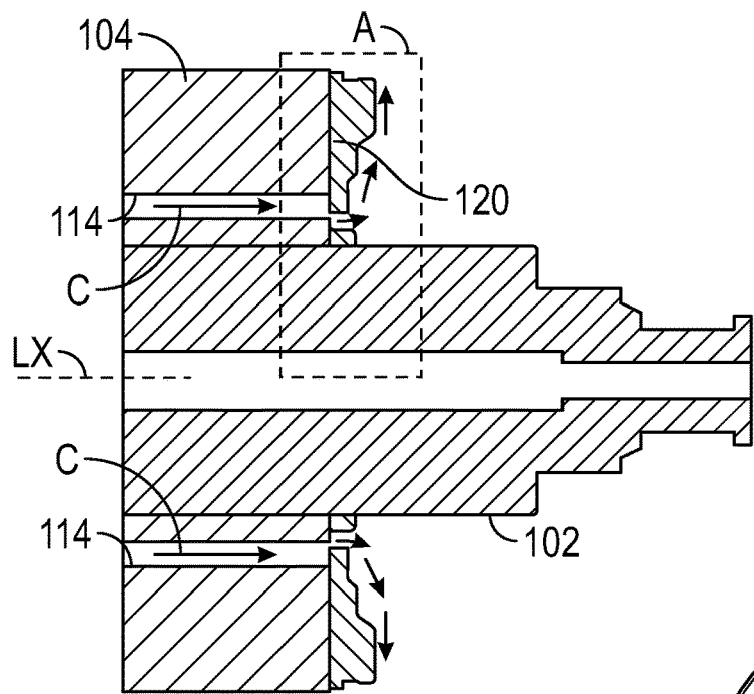
FIG. 21 schematically illustrates a cross-sectional side view of a permanent magnet electric motor in accordance with an aspect of the present disclosure.
Figure 22:
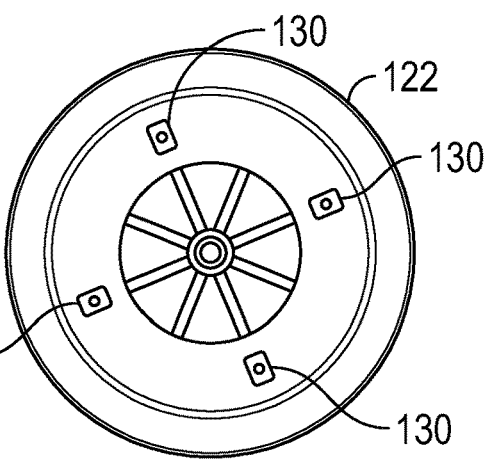
Figure 21A:
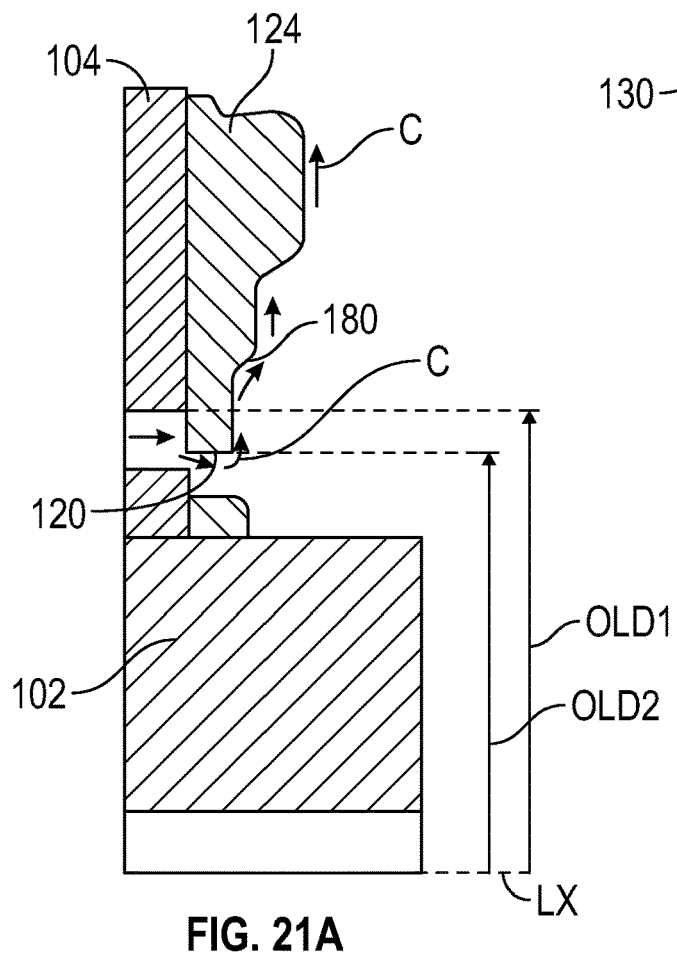
FIG. 21A schematically illustrates an enlarged, cross-sectional side view of a portion of the permanent magnet electric motor of FIG. 21.

22 schematically illustrates a front view of the permanent magnet electric motor of FIG. 21.

Figure 23:
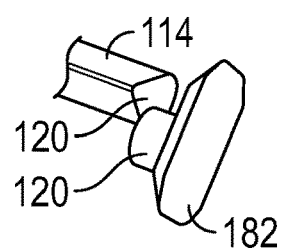

FIG. 23 schematically illustrates an isometric view of a portion of the permanent magnet electric motor of FIG. 21.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import. Throughout the disclosure, like or similar reference numbers refer to like or similar components.

Figure 1:
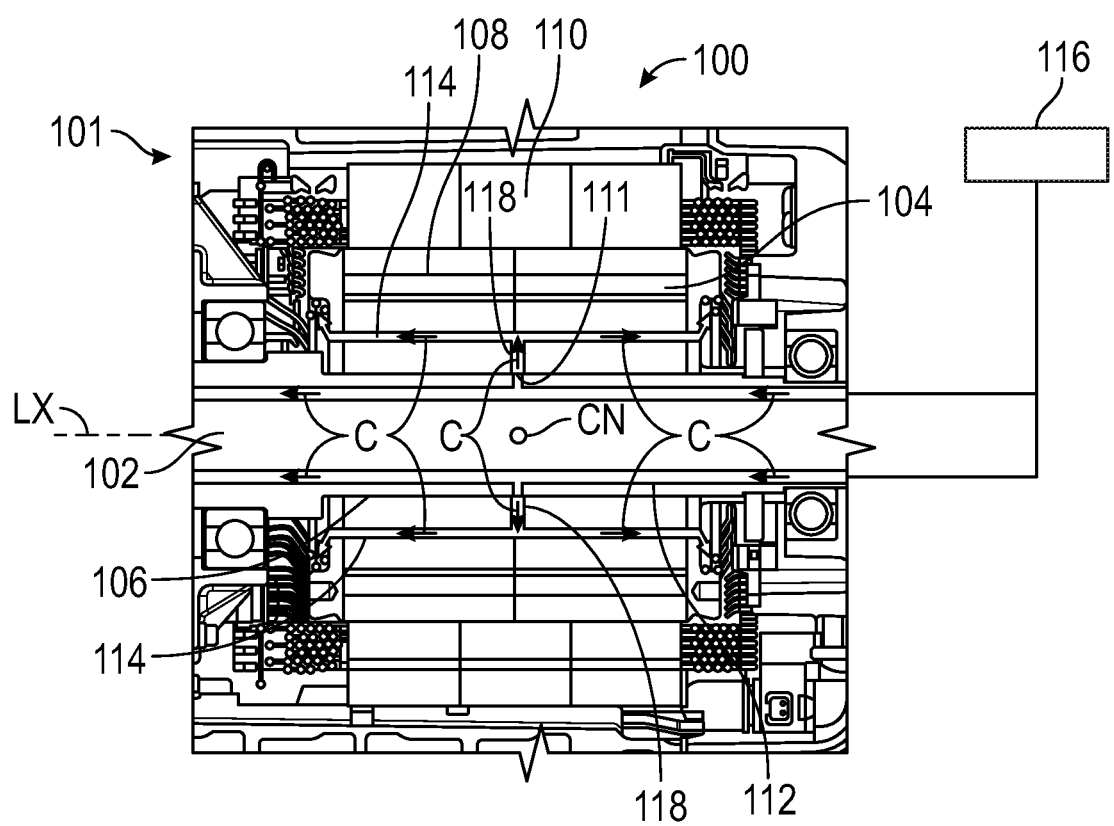
FIG. 1 schematically illustrates a cross-section of a permanent magnet electric motor in accordance with an aspect of the present disclosure.

FIG. 1 shows a schematic cross-sectional view of a permanent magnet electric motor 100 configured to convert mechanical energy into electricity and vice-versa. The electric motor 100 includes a shaft 102 extending along a longitudinal axis LX. The electric motor 100 further includes a rotor 104 mounted on the shaft 102. The rotor 104 is rotatable concomitantly with the shaft 102 about the longitudinal axis LX. The rotor 104 defines an innermost rotor edge 106 and an outermost rotor edge 108 opposite the innermost rotor edge 106. The outermost rotor edge 108 is farther from the center CN (FIG. 5) of the rotor 104 than the innermost rotor edge 106. The innermost rotor edge 106 of the rotor 104 defines a shaft opening 111 for receiving coolant C. The rotor 104 further has an outermost rotor edge 108 opposite the innermost rotor edge 106. A stator 110 is disposed around the outermost rotor edge 108 of the rotor 104. The electric motor 100 includes stator 110 coupled to the rotor 104. The stator 110 is disposed around the rotor 104 and remains stationary relative to the rotor 104. The electric motor 100 further defines a shaft jacket 112 of the shaft 102.

The shaft jacket 112 is configured to receive a coolant C (e.g., oil). The jacket 112 is disposed about the longitudinal axis LX to cool the shaft 102. The jacket 112 may have an annular shape to uniformly cool the shaft 102. Further, the jacket 112 is elongated in a first direction X to cool the shaft 102 along its entire length. The first direction X is parallel to the longitudinal axis LX. The jacket 112 may be entirely disposed inside the shaft 102 to effectively cool the shaft 102. The jacket 112 is in direct fluid communication with a coolant source 116. As such, the coolant source 116 supplies the coolant C to the jacket 112. As a result, the coolant C flows directly from the coolant source 116 to the shaft jacket 112. The coolant source 116 and the electric motor 100 collectively define a motor assembly 101.

The rotor 104 defines a plurality of longitudinal channels 114 in fluid communication with the shaft jacket 112. Each longitudinal channel 114 is elongated along the first direction X to cool the rotor 104 along most (or all) of its length to maximize heat transfer. Each longitudinal channel 114 is in fluid communication with the shaft jacket 112 to allow fluid flow between the jacket 112 and the longitudinal channels 114. Each longitudinal channel 114 is entirely disposed inside the rotor 104 to effectively cool the rotor 104. The shaft jacket 112 is spaced apart from the longitudinal channels 114 along a second direction Y. The second direction Y is perpendicular to the first direction X.

Figure 7:
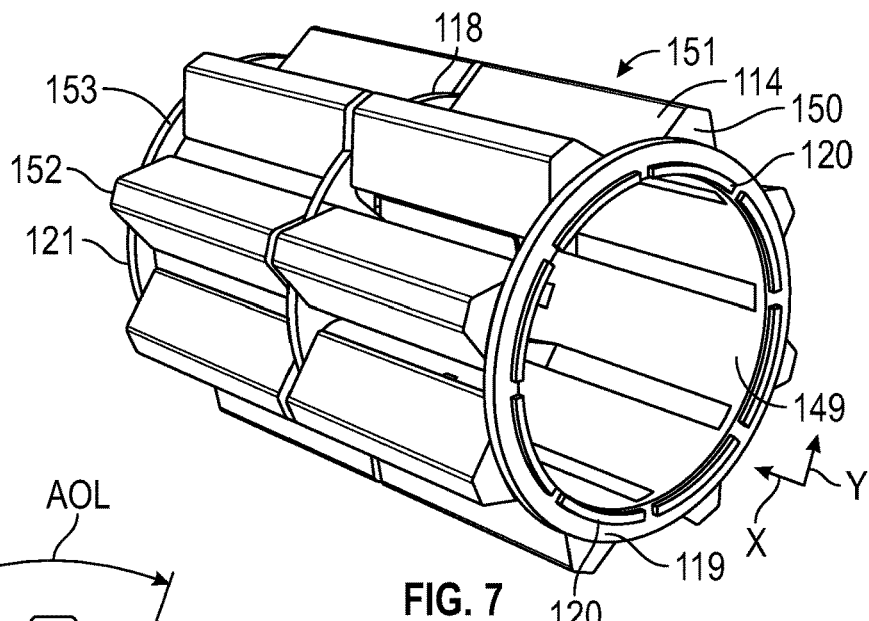
FIG. 7 schematically illustrates an isometric view of a rotor jacket of the rotor of FIG. 2.

With reference to FIGS. 1 and 7, the electric motor 100 further includes a plurality of inlets 118 each fluidly interconnecting the jacket 112 to the longitudinal channels 114. At least one of the inlets 118 is directly connected to one of the longitudinal channels 114 to facilitate flow between the jacket 112 and the longitudinal channels 114. Each of the inlets 118 may have an inlet diameter between three and five millimeters to distribute the coolant C uniformly in the longitudinal channels 114 and enhance the coolant mass dynamic balance. The inlets 118 are located at the center CN of the rotor 104 to distribute the coolant C uniformly in a rotor jacket 151 and enhance the coolant mass balance. For example, the inlets 118 are located at a longitudinal midpoint ILM between a first longitudinal end 119 and a second longitudinal end 121 of the rotor jacket 151 to evenly distribute the coolant C in the longitudinal channels 114 and enhance the coolant mass dynamic balance. The first longitudinal end 119 is opposite the second longitudinal end 121. A distance ILD1 from the first longitudinal end 119 to the longitudinal midpoint ILM is equal to a distance from the longitudinal midpoint ILM to the second longitudinal end ILD2. The first longitudinal end 119 is spaced apart from the second longitudinal end 121 along the first direction X.

With reference to FIG. 7, the rotor jacket 151 includes an inner edge 149 and an outer edge 153 opposite the inner edge 149. The inner edge 149 is spaced from the outer edge 153 along a second direction Y. The second direction Y is perpendicular to the first direction X. The rotor jacket 151 further includes a plurality of outlets 120 each in fluid communication with the plurality of longitudinal channels 114 to allow the coolant C to flow from the plurality of longitudinal channels 114 to the plurality of outlets 120 to exit the rotor jacket 151. The outlets 120 are spaced apart from the inlets 118 along the first direction X to allow the coolant C to cool most of the length of the rotor 104. The outer edge 172 of outlet 120 is below the outer edge 153 of channel 114 and each of the outlets 120 is closer to the inner edge 149 than to the outer edge 153 of the rotor jacket 151 to hinder the coolant C from flowing back into the inlets 118 toward the shaft jacket 112, thereby maximizing a time that the coolant C resides inside the longitudinal channels 114 and maximizing heat transfer between the rotor 104 and the coolant C. Further, the outlets 120 are located at the first longitudinal end 119 and the second longitudinal end 121 of the rotor jacket 151 to maximize heat transfer between the rotor 104 and the coolant C. The rotor jacket 151 includes between four and twelve outlets 120 to enhance the coolant mass dynamic balance.

Figure 2:
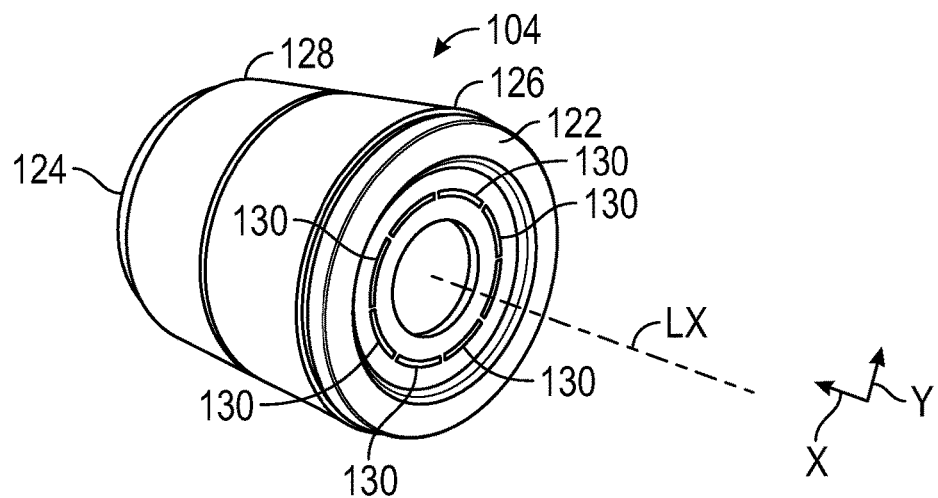
FIG. 2 schematically illustrates an isometric view of the rotor of the permanent magnet electric motor of FIG. 1.
Figure 3:
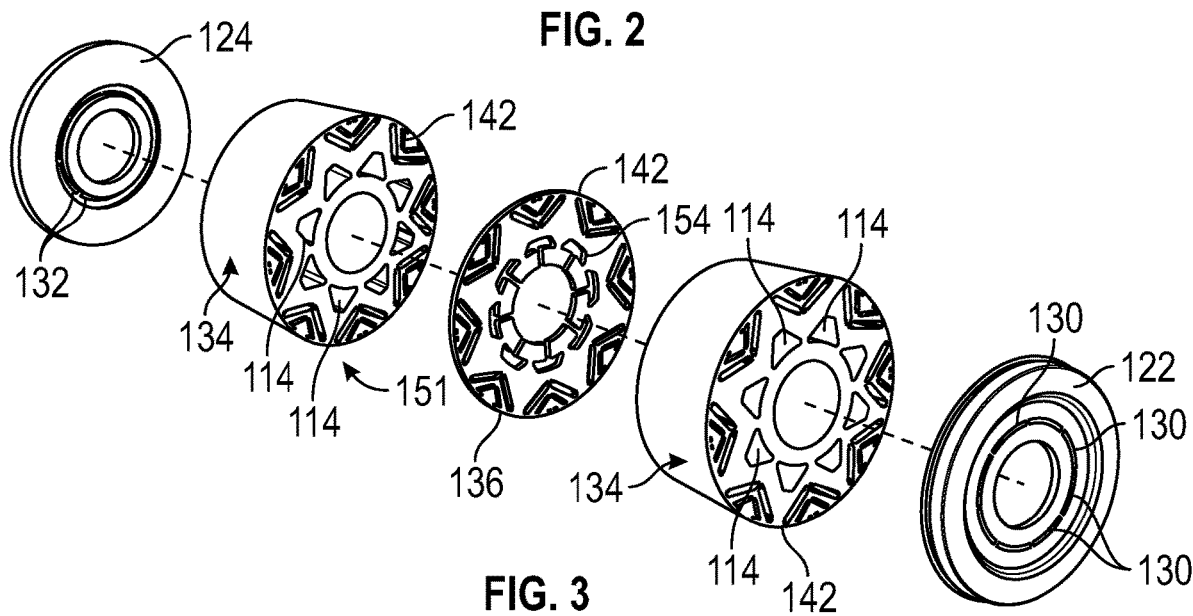
FIG. 3 schematically illustrates an isometric, exploded view of the rotor of FIG. 2.
Figure 4:
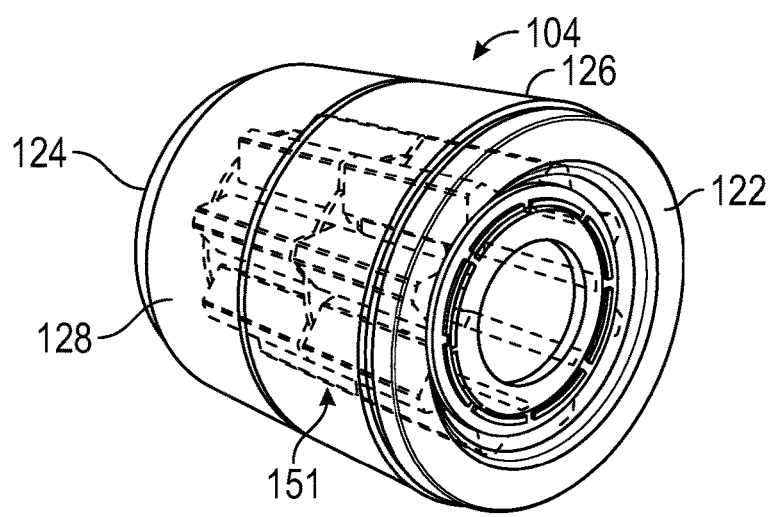
FIG. 4 schematically illustrates an isometric view of the rotor of FIG. 2, showing in inner portions of the rotor in hidden lines.

With reference to FIGS. 2-4, the electric motor 100 further includes a first end ring 122 and a second end ring 124 opposite the first end ring 122. The rotor 104 includes a first rotor end 126 and a second rotor end 128 opposite to the first rotor end 126. The first rotor end 126 is spaced apart from the second rotor end 128 along the first direction X. The first end ring 122 is attached to the rotor 104 at the first rotor end 126. The second end ring 124 is attached to the rotor 104 at the second rotor end 128. The first end ring 126 defines a first group of openings 130. The first group of openings 130 is annularly arranged around the longitudinal axis LX to define some of the outlets 120. The first group of openings 130 extend through the entire thickness of the first end ring 122 and the second end ring 124. The second end ring 124 defines a second group of openings 132. The second group of openings 132 is annularly arranged around the longitudinal axis LX to define some of the outlets 120.

Figure 5:
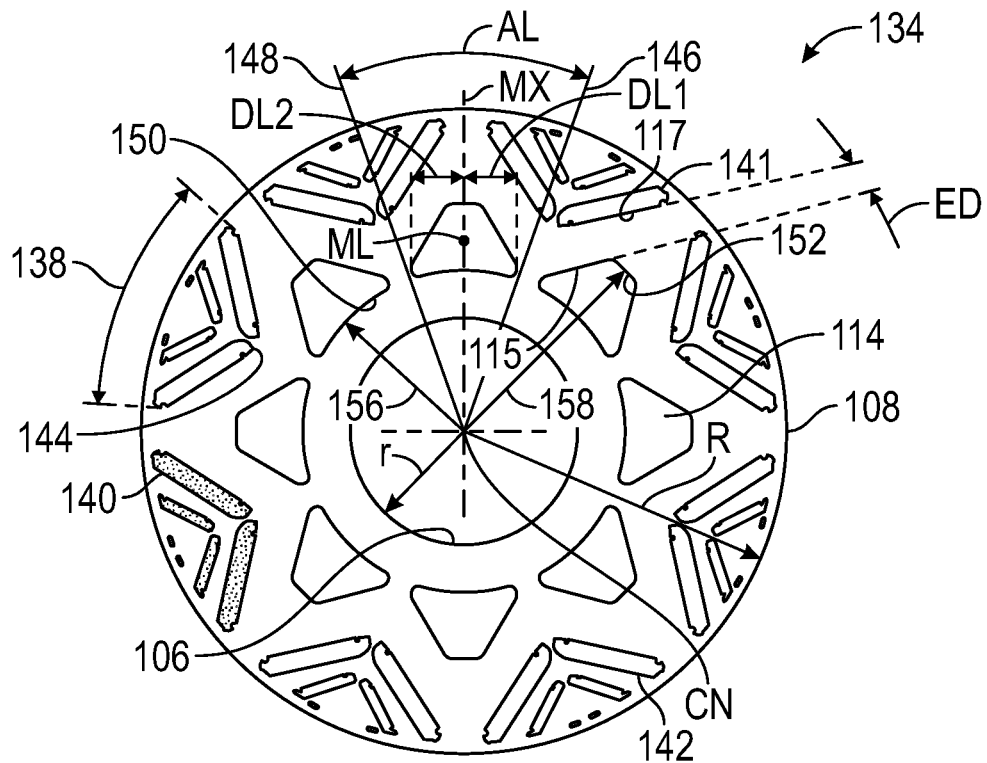
FIG. 5 schematically illustrates a front view of a lamination of the rotor of FIG. 2.
Figure 6:
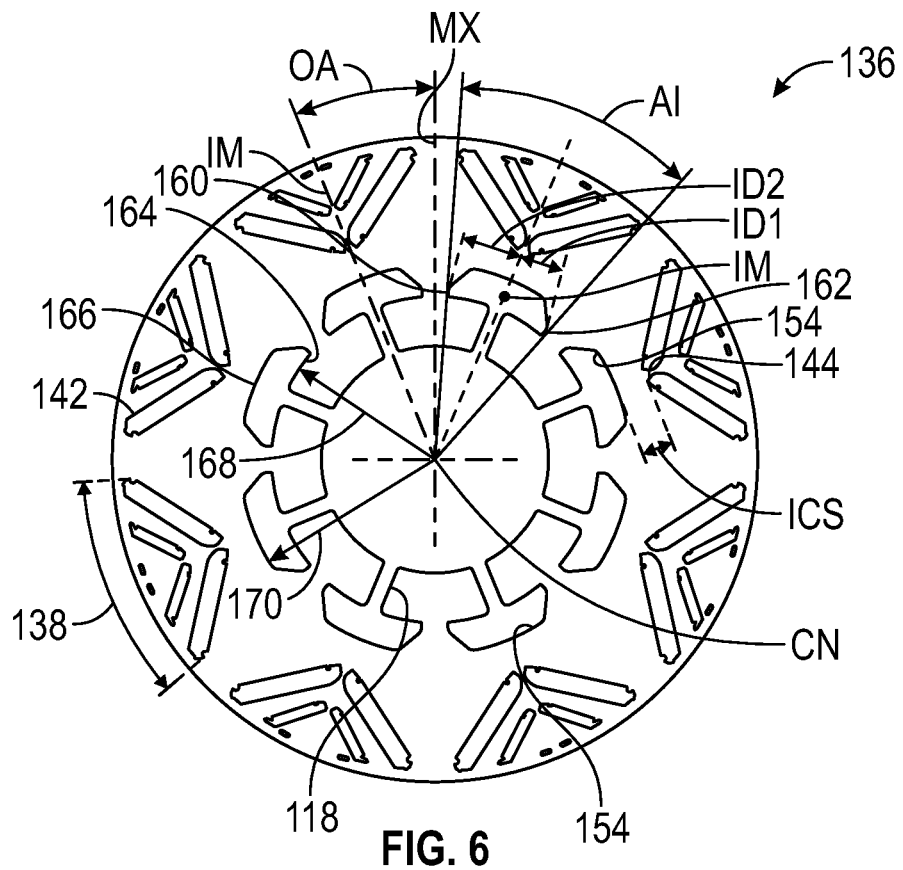
FIG. 6 schematically illustrates a front view of another lamination of the rotor of FIG. 2.

With continued reference to FIGS. 2-5, the rotor 104 may be at least partially formed by a plurality of laminations (i.e., first laminations 134 and second laminations 136). FIG. 5 shows the first lamination 134, and FIG. 6 shows the second lamination 136. The first laminations 134 are stacked together to form the longitudinal channels 114. The second laminations 136 are stacked together to form the inlets 118 and a plurality of interconnection channels 154.

With reference to FIGS. 3 and 5, the electric motor 100 includes a plurality of pole pieces 138. Each pole piece 138 has permanent magnets 140 and permanent magnet slots 142. While the figures show some of the permanent magnets 140 for simplicity, each permanent magnet slot 142 receives a permanent magnet 140. Thus, each permanent magnet slot 142 is sized to receive a permanent magnet 140. Each permanent-magnet slot has an innermost slot point 144. The innermost slot point 144 may be disposed at a location that is closest to the center CN of the rotor 104. Each permanent magnet slot 142 defines a lateral slot end 141. Each of the plurality of longitudinal channels 114 has an outermost side channel edge 115. The distance ED from the outermost side channel edge 115 to the lateral slot end 117 is greater than three millimeters to maximize heat reduction in the rotor 104. The upper limit of the distance ED may be determined based on the dimensional requirements and/or restrictions of the electric motor 100.

Each longitudinal channel 114 has a first lateral end 146 and a second lateral end 148 opposite the first lateral end 146. Each longitudinal channel 114 is shaped as an arc extending from the first lateral end 146 to the second lateral end 148. Each longitudinal channel 114 defines a central angle AL. The central angle AL of each longitudinal channel 114 is subtended by the arc extending from the first lateral end 146 to the second lateral end 148. The central angle AL of each longitudinal channel 114 is less than $$\frac{360°}{M} \times 0.95 \text{ degrees},$$

where M is the number of pole pieces 138, in order to maximize the convective surface area, thereby enhancing cooling. The lower limit of the central angle AL of each longitudinal channel 114 may be determined based on the dimensional requirements and/or restrictions of the electric motor 100. While the depicted embodiment shows eight pole pieces 138, the electric motor 100 may include more or fewer pole pieces 138.

The rotor 104 has an innermost rotor radius r. The innermost rotor radius r (in millimeters) is defined from the center CN of the rotor 104 to the innermost rotor edge 106.

Each longitudinal channel 114 defines an innermost longitudinal-channel end 150 and an outermost longitudinal-channel end 152 opposite the innermost longitudinal-channel end 150. The outermost longitudinal-channel end 152 of each longitudinal channel 114 is farther from the center CN of the rotor 104 than the innermost longitudinal-channel end 152 of each longitudinal channel 114. Each longitudinal channel 114 defines an innermost longitudinal-channel radius 156 and an outermost longitudinal-channel radius 158. The innermost longitudinal-channel radius 156 is defined from the center CN of the rotor 104 to the innermost longitudinal-channel end 150. The innermost longitudinal-channel radius 156 (in millimeters) is equal to or greater than r+5~10 millimeters, where r is the innermost rotor radius in millimeters, in order to optimize coolant mass dynamic balance. The upper limit of the innermost longitudinal-channel radius 156 of each longitudinal channel 114 may be determined based on the dimensional requirements and/or restrictions of the electric motor 100.

The rotor 104 has an outermost rotor radius R. The outermost rotor radius R (in millimeters) is defined from the center CN of the rotor 104 to the outermost rotor edge 108 of the rotor 104. The outermost longitudinal-channel radius 158 is defined from the center CN of the rotor 104 to the outermost longitudinal-channel end 152 of each longitudinal channel 114. The outermost longitudinal-channel radius 158 (in millimeters) is equal to or less than R−10~20 millimeters, where R is the outermost rotor radius in millimeters, in order to maximize the convective surface area, thereby enhancing cooling. The lower limit of the outermost longitudinal-channel radius 158 may be determined based on the dimensional requirements and/or restrictions of the electric motor 100. Each longitudinal channel 114 has a longitudinal-channel midpoint ML between the first lateral end 146 and the second lateral end 148. A first longitudinal-channel distance DL1 from the first lateral end 146 to the longitudinal-channel midpoint ML is equal to a second longitudinal-channel distance DL2 from the second lateral end 148 to the longitudinal-channel midpoint ML. The longitudinal-channel midpoint ML is intersected by a midpoint axis MX that extends from the center CN of the rotor 104 to the longitudinal-channel midpoint ML.

With reference to FIGS. 3-6, the rotor 104 defines a plurality of interconnection channels 154 formed by the second laminations 136 when stacked together. The interconnection channels 154 and the longitudinal channels 114 collectively define a rotor jacket 151. Each interconnection channel 154 directly interconnects an adjacent pair of longitudinal channels 114 to direct the coolant C from one of the longitudinal channels 114 to another, adjacent longitudinal channels 114. Each interconnection channel 154 is entirely disposed inside the rotor 104 to effectively cool the rotor 104. Each interconnection channel 154 has an interconnection-channel midpoint IM. Each interconnection channel 154 includes a first side-end 160 and a second side-end 162 opposite the first side-end 160. The first interconnection-channel distance ID1 from the first side-end 160 to the interconnection-channel midpoint IM is equal to a second interconnection-channel distance ID2 from the second side-end 162 to the interconnection-channel midpoint IM. Each interconnection channel 154 is shaped as an arc extending from the first side-end 160 to the second side-end 162. Each interconnection channel 154 is angularly offset from an adjacent longitudinal channel 114 by an offset angle OA. The offset angle OA is defined from the longitudinal-channel midpoint ML of one of the longitudinal channels 114 to the interconnection-channel midpoint IM of the adjacent interconnection channels 154. The offset angle is equal to $$\frac{360°}{M} \times 0.95,$$

where M is the number of pole pieces 138 in order to enhance the coolant mass dynamic balance. The distance ICS from an outermost interconnection-channel end 166 to the innermost slot point 144 is between three and eight millimeters to optimize heat transfer between the rotor 104 and the coolant C.

Each interconnection channel 154 defines an innermost interconnection-channel end 164 and an outermost interconnection-channel end 166 opposite the innermost interconnection-channel end 164. The outermost interconnection-channel end 166 of each interconnection channel 154 is farther from the center CN of the rotor 104 than the innermost interconnection-channel end 164 of each interconnection channel 154. Each interconnection channel 154 defines an innermost interconnection-channel radius 168 and an outermost interconnection-channel radius 170. The innermost interconnection-channel radius 168 is defined from the center CN of the rotor 104 to the innermost interconnection-channel end 164. The innermost interconnection-channel radius 164 (in millimeters) is equal to or greater than r+5~10 millimeters, where r is the innermost rotor radius in millimeters, in order to maximize the convective surface area, decrease the rotor mass, and reduce magnet temperature. The lower limit of the innermost interconnection-channel radius 164 may be determined based on the dimensional requirements and/or restrictions of the electric motor 100.

Each interconnection channel 154 defines an outermost interconnection-channel radius 170. The outermost interconnection-channel radius 170 (in millimeters) is defined from the center CN of the rotor 104 to the outermost interconnection-channel end 166 of each interconnection channel 154. The outermost longitudinal-channel radius 170 is equal to or less than R−10 millimeters, where R is the outermost rotor radius in millimeters, in order to maximize the convective surface area, decrease the rotor mass, and reduce magnet temperature. The upper limit of the outermost longitudinal-channel radius 170 may be determined based on the dimensional requirements and/or restrictions of the electric motor 100.

Each interconnection channel 154 is shaped as an arc extending from the first side-end 160 to the second side-end 162. Each interconnection channel 154 has a central angle AI. The central angle AI of each interconnection channel 154 is subtended by the arc extending from the first side-end 160 to the second side-end 162. The central angle AI of each of the plurality of interconnection channels 154 is less than $$\frac{360°}{M} \times 0.95 \text{ degrees},$$

and M is the number of pole pieces 138, in order to enhance the coolant mass dynamic balance. The lower limit of the central angle AI of each interconnection channel 154 may be determined based on the dimensional requirements and/or restrictions of the electric motor 100. While the depicted embodiment shows eight pole pieces 138, the electric motor 100 may include more or fewer pole pieces 138. As shown in FIG. 5, the first laminations 134 and second laminations 136 may be arranged to include interconnection channels 154 solely at the ends of the rotor 104.

Figure 8:
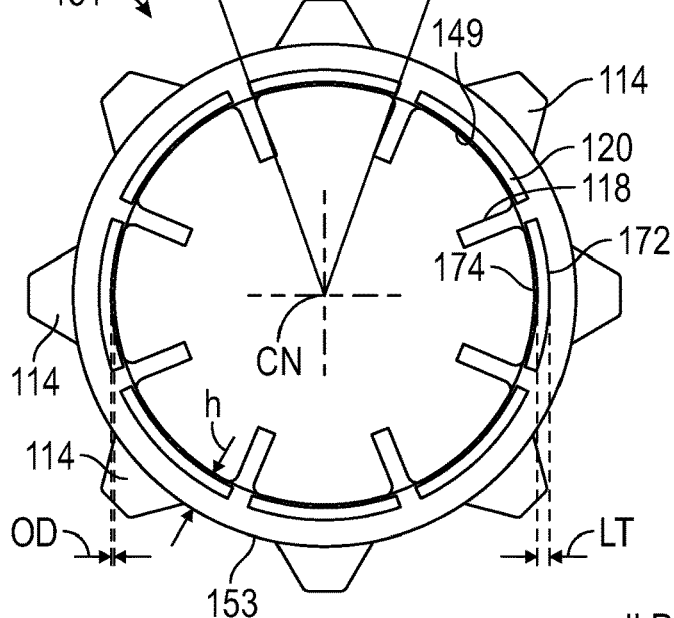
FIG. 8 schematically illustrates a front view of the rotor jacket of FIG. 7.
Figure 9:
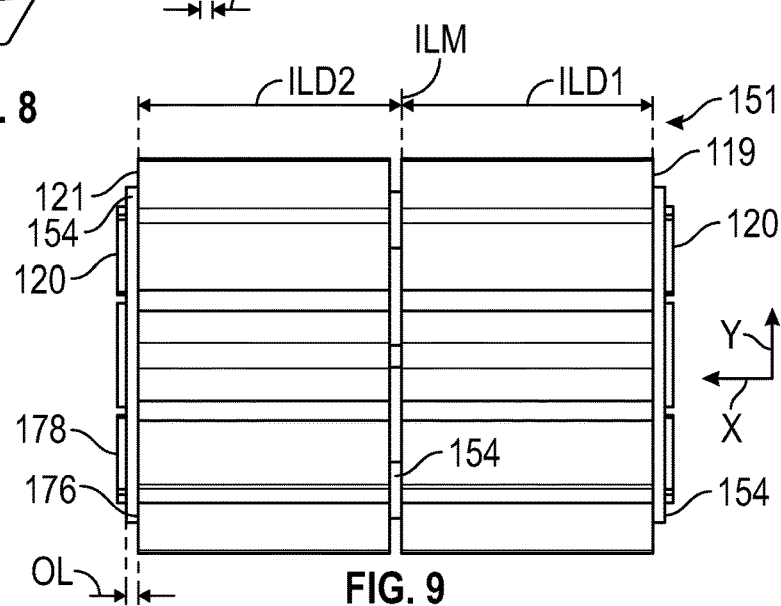
FIG. 9 schematically illustrates a side view of the rotor jacket of FIG. 8.
Figure 10:
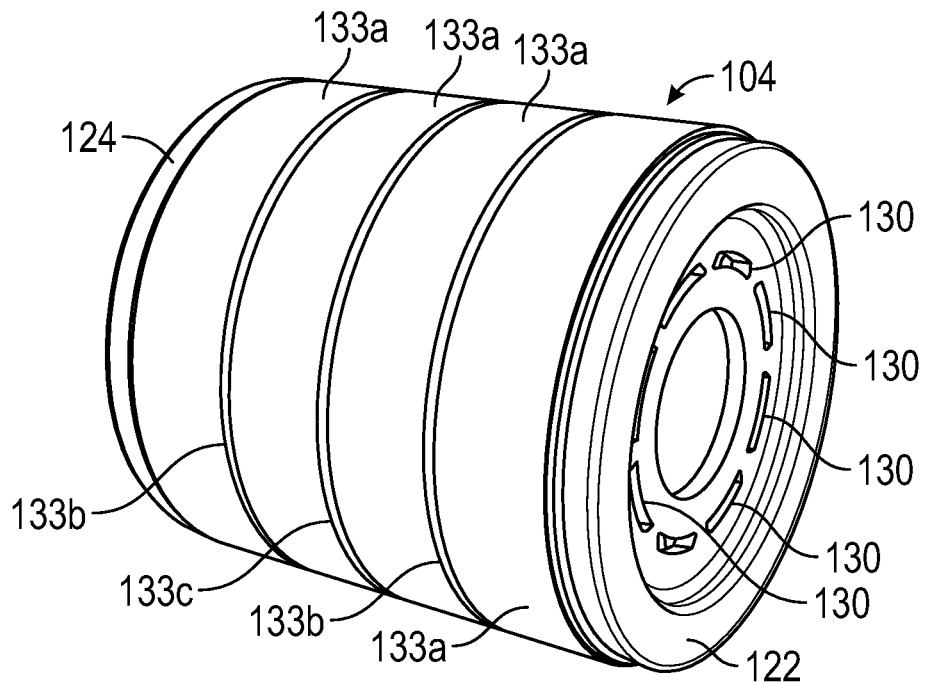
FIG. 10 schematically illustrates an isometric view of a rotor in accordance with an aspect of the present disclosure.
Figure 11:
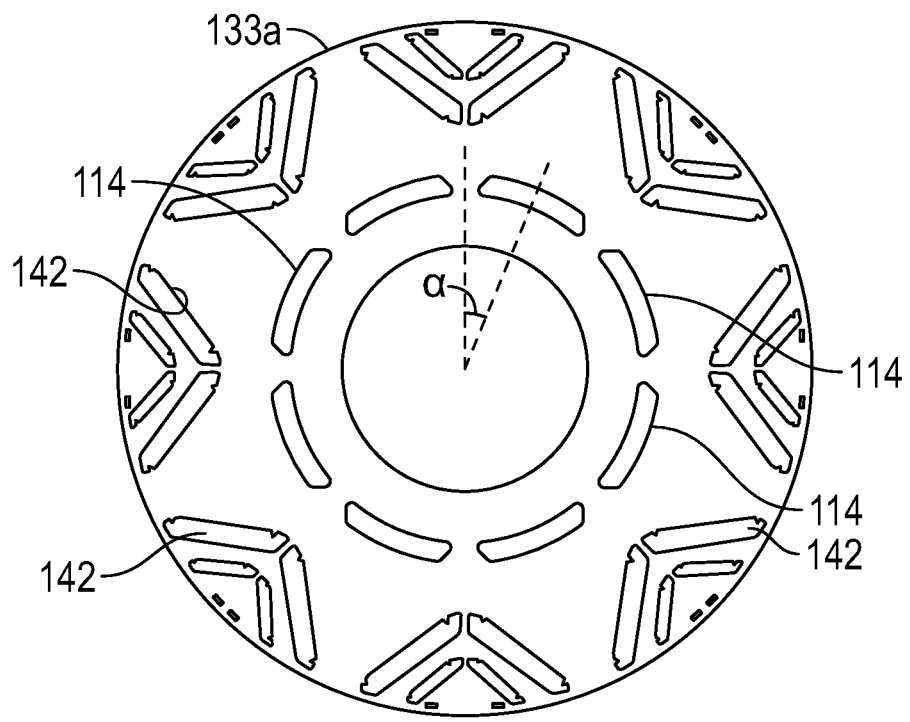
FIG. 11 schematically illustrates a front view of a lamination of the rotor of FIG. 10.
Figure 12:
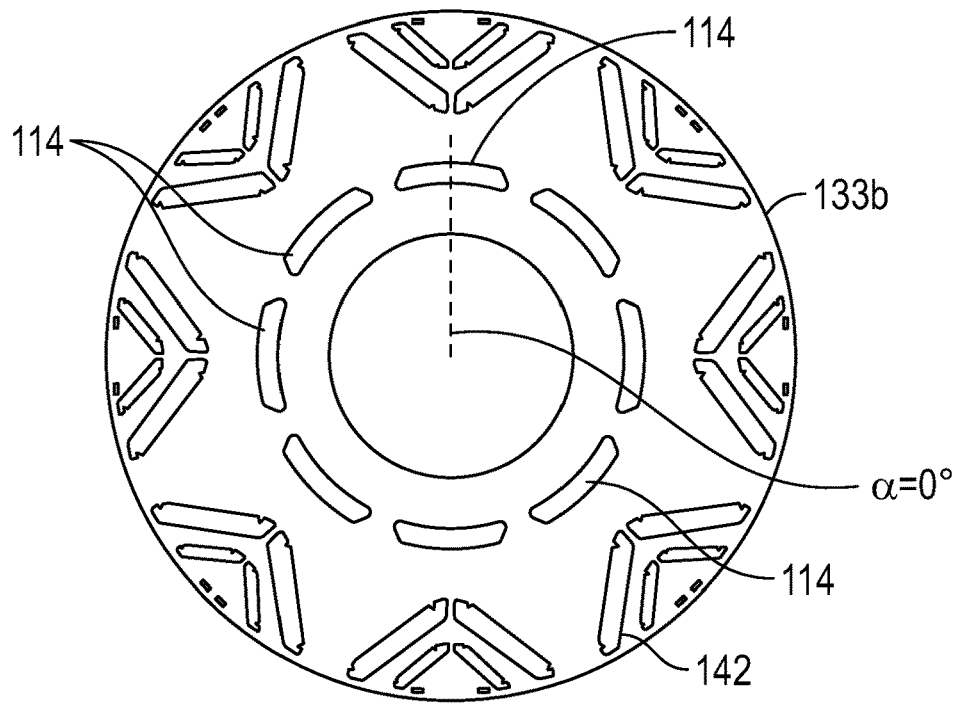
FIG. 12 schematically illustrates a front view of another lamination of the rotor of FIG. 10.
Figure 13:
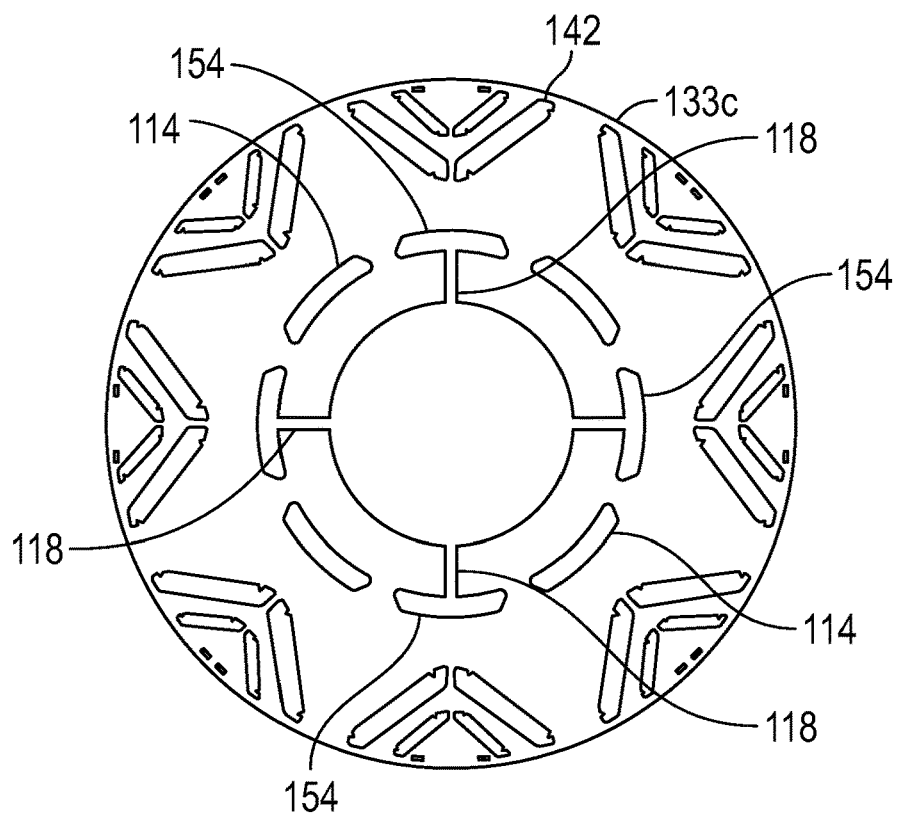
FIG. 13 schematically illustrates a front view of yet another lamination of the rotor of FIG. 10.

With reference to FIGS. 8 and 9, as discussed above, the rotor jacket 151 incudes outlets 120 that are closer to the inner edge 149 than to the outer edge 153 to hinder the coolant C from flowing back into the inlets 118 toward the shaft jacket 112, thereby maximizing a time that the coolant C resides inside the longitudinal channels 114 and maximizing heat transfer between the rotor 104 and the coolant C. Each outlet 120 includes an outer outlet edge 172 and an inner outlet edge 174 opposite outer outlet edge 172. A distance h is defined from the inner edge 149 and the outer edge 153. The distance OD from the inner edge 149 to the inner outlet edge 174 of each outlet 120 may be between r+0 h and r+0.3 h, to hinder the coolant C from flowing back into the inlets 118 toward the shaft jacket 112, thereby maximizing a time that the coolant C resides inside the longitudinal channels 114 and maximizing heat transfer between the rotor 104 and the coolant C. As discussed above, the distance h is defined from the inner edge 149 and the outer edge 153. Each outlet 120 has a thickness LT between 0.1 h and 0.7 h but the outer edge 172 of outlet 120 is below the outer edge 153 of channel 114 to maximize heat transfer. The thickness LT is defined as the distance from the outer outlet edge 172 to the inner outlet edge 174. Each interconnection channel 154 has a length OL between 0.7 h and 1.4 h to optimize cooling. The length OL of each interconnection channel 154 is defined from a first end 176 to a second end 178. The first end 176 is opposite the second end 178. The second end 178 is spaced apart from the first end 176 along the first direction X. The rotor jacket 151 may have the same number of outlets 120 as pole pieces 138 to enhance the coolant mass dynamic balance. The central angle AOL of each outlet 120 is less than $$\frac{360°}{M} \times 0.95 \text{ degrees},$$

where M is the number of pole pieces 138, in order to maximize the convective surface area, thereby enhancing cooling.

With FIGS. 10-13, in another aspect of the present disclosure, the rotor 104 includes the rotor jacket 151 and may include outlets 120 at least partially defined by the openings 130 of the first end ring 122 and the second end ring 124. In the depicted embodiment, the rotor jacket 151 is defined by three different laminations (i.e., laminations 133a, 133b, 133c). All the lamination 133a, 133b, and 133c define permanent magnet slots 142. The laminations 133b is disposed at a midpoint of the length of the rotor 104. Two laminations 133a are sandwiched between the lamination 133c at the midpoint of the length of the rotor 104. One lamination 133b is closer to the first end ring 122 than to the second end ring 124 and is sandwiched by two laminations 133a. Another lamination 133b is closer to the second end ring 124 than to the first end ring 122 and is sandwiched by two laminations 133a. The lamination 133a and the lamination 133b define the longitudinal channels 114. The lamination 133c defines interconnection channels 154. The laminations 133a and lamination 133b are similar to each other, except for their orientation in the rotor 104. In the rotor 104, the lamination 133a is annularly offset relative to the lamination 133b by a lamination offset angle α. For reference, in FIG. 12, the lamination offset angle α is zero (i.e., α=0°). The lamination offset angle α may be an acute angle. The lamination 133c defines inlets 118 that are in direct fluid communication with some of the longitudinal channels 114. However, not all of the longitudinal channels 114 are in direct fluid communication with the inlets 118. As a result, the rotor jacket 151, includes a single annular row defined by the interconnection channels 154. As discussed above, the interconnection channels 154 are defined by the lamination 133c and are disposed at the midpoint of the length of the rotor 104.

Figure 14:
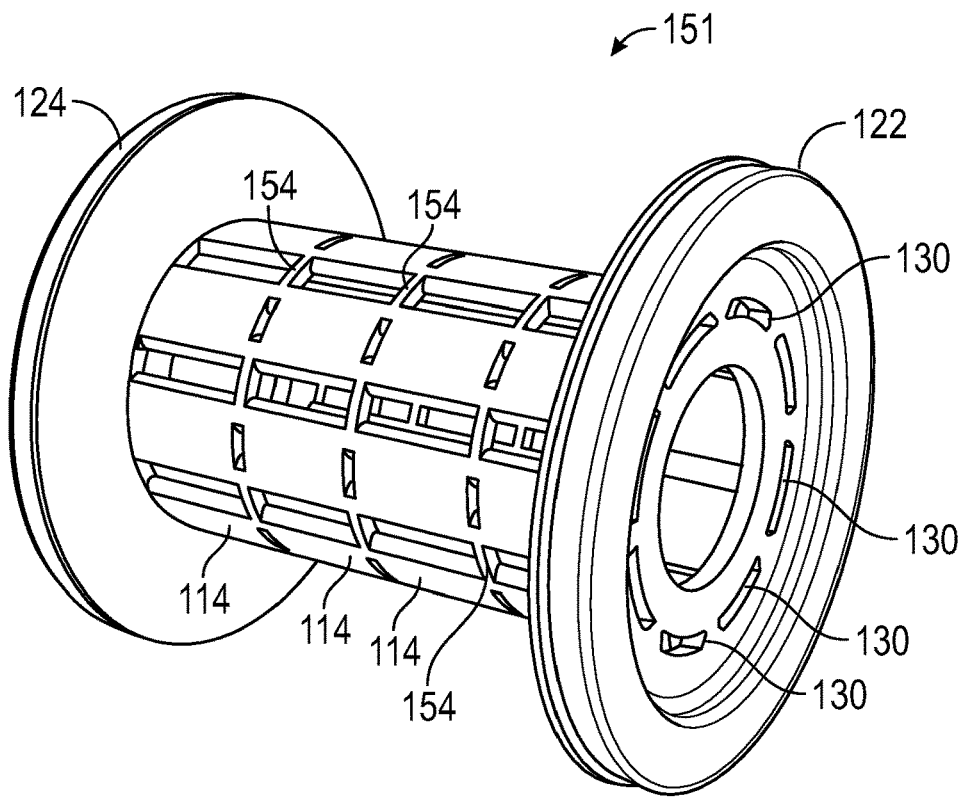
FIG. 14 schematically illustrates an isometric view of a rotor jacket and end rings of the rotor of FIG. 10 according to another aspect of the present disclosure.

With reference to FIG. 14, in another aspect of the present disclosure, the rotor 104 has three annular rows of interconnection channels 154. The three annular rows of interconnection channels 154 are spaced apart from each other. In the depicted embodiment, the interconnection channels 154 may be formed by the laminations 133b and lamination 133c. The longitudinal channels 114 are formed by the lamination 133a.

Figure 15:
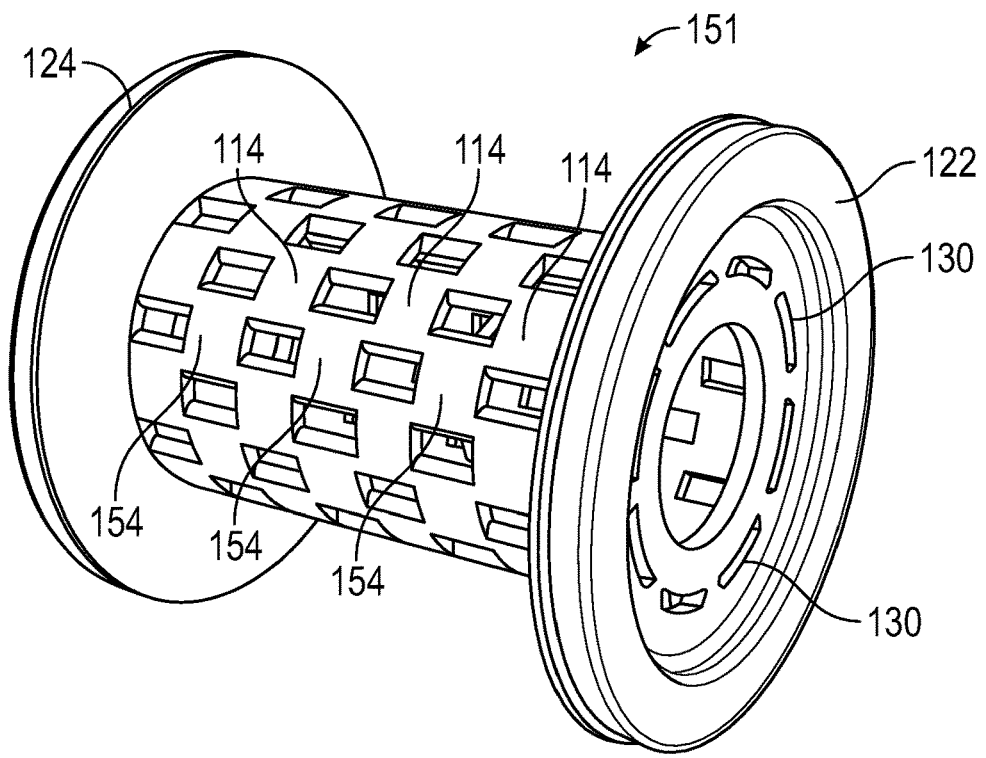
FIG. 15 schematically illustrates an isometric view of a rotor jacket and end rings of the rotor of FIG. 10 according to another aspect of the present disclosure.

With reference to FIG. 15, in another aspect of the present disclosure, the rotor 104 has multiple interconnection channels 154 and multiple longitudinal channels 114. The longitudinal channels 114 and the interconnection channels 154 have the same lengths.

Figure 16:
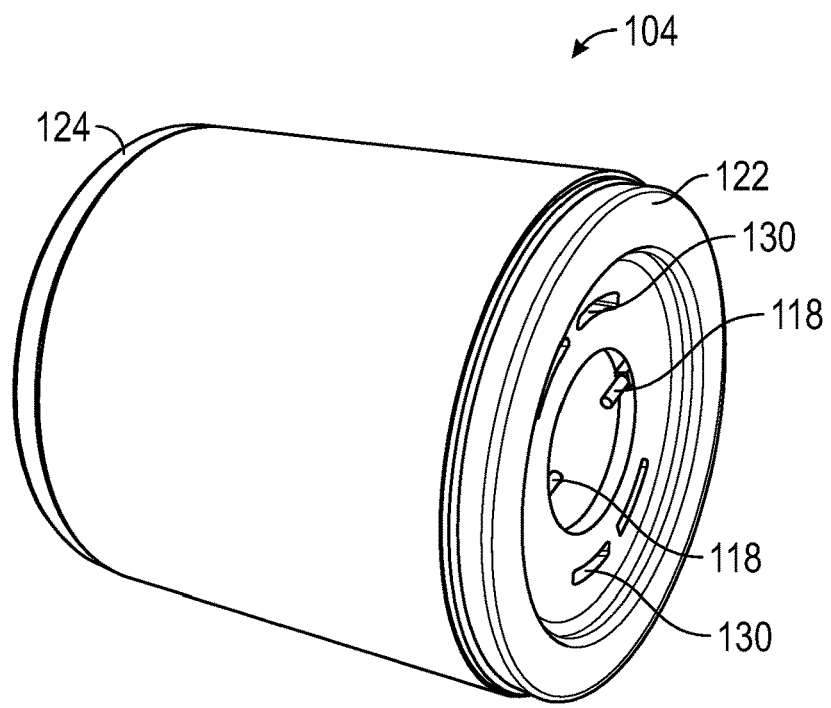
FIG. 16 schematically illustrates an isometric view of a rotor in accordance with another aspect of the present disclosure.
Figure 17:
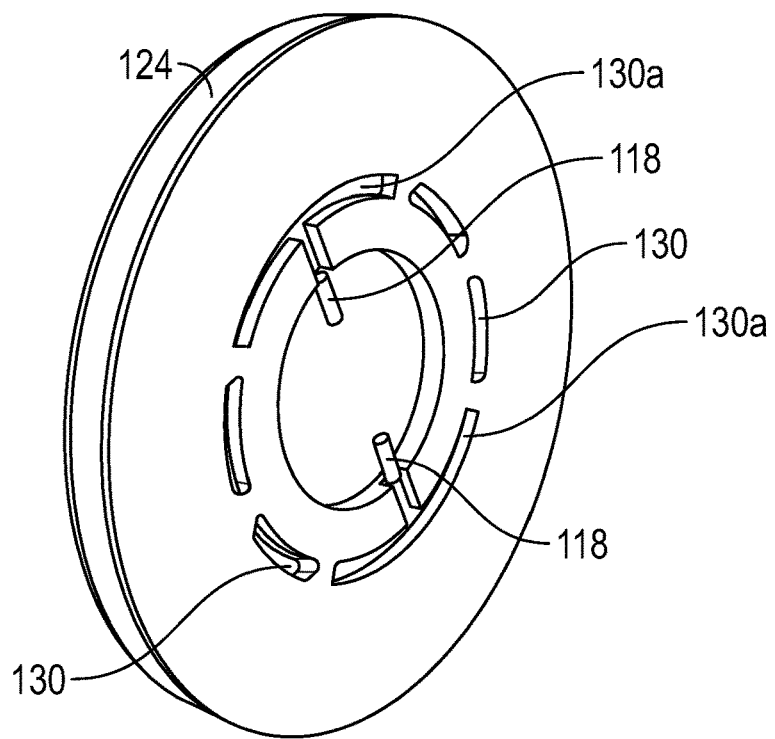
FIG. 17 schematically illustrates an isometric view of an end ring of the rotor of FIG. 16.
Figure 18:
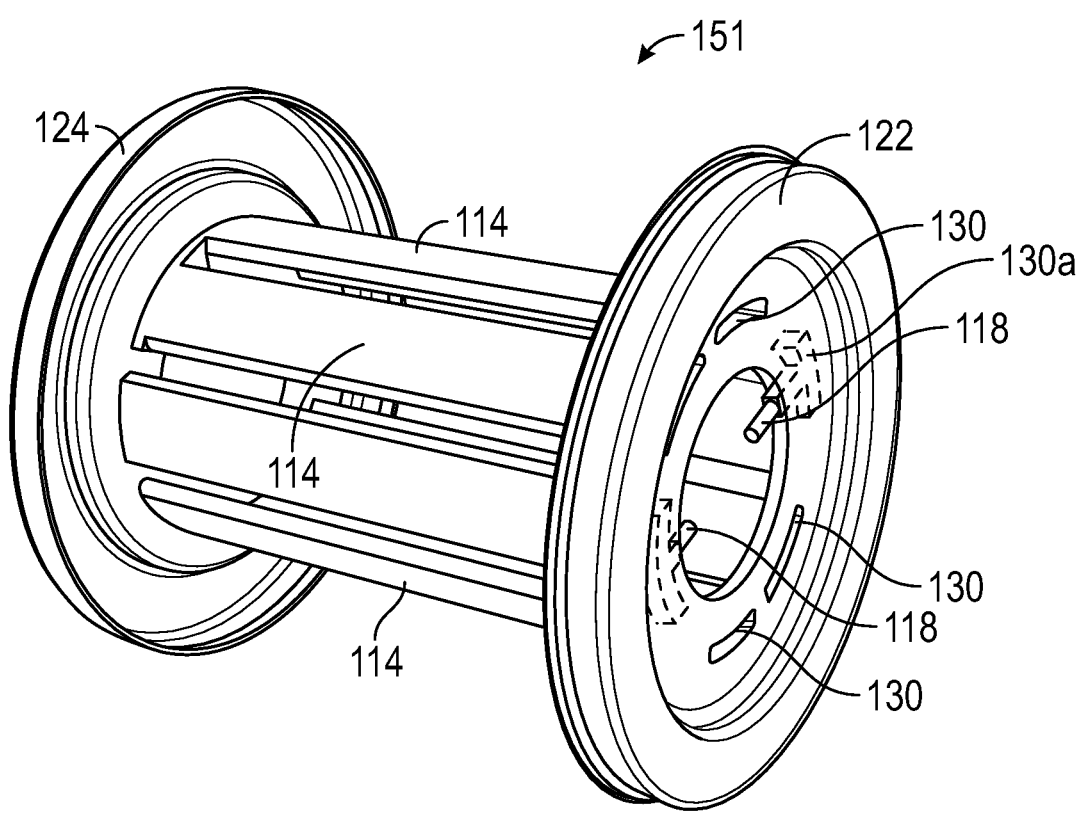
FIG. 18 schematically illustrates an isometric view of end rings and a rotor jacket of the rotor of FIG. 16.

With reference to FIGS. 16, 17, and 18, in another aspect of the present disclosure, the rotor 104 has the first end ring 122 and the second end ring 124. Each of the first end ring 122 and the second end ring 124 has openings 130 at least partially forming outlets 120. The inlets 118 are directly coupled to the first end ring 122 and the second end ring 124. The openings 130 extend through the entire thickness of the second end ring 124. The first end ring 122 and the second end ring 124 each defines channels 130a that are inside the respective end ring and do not extend through the entire thickness of the respective end ring. The channels 130a are in fluid communication with the inlets 118 and the longitudinal channel 114 to allow coolant from the inlets 118, into the channels 130, and then into the longitudinal channels 114.

Figure 19:
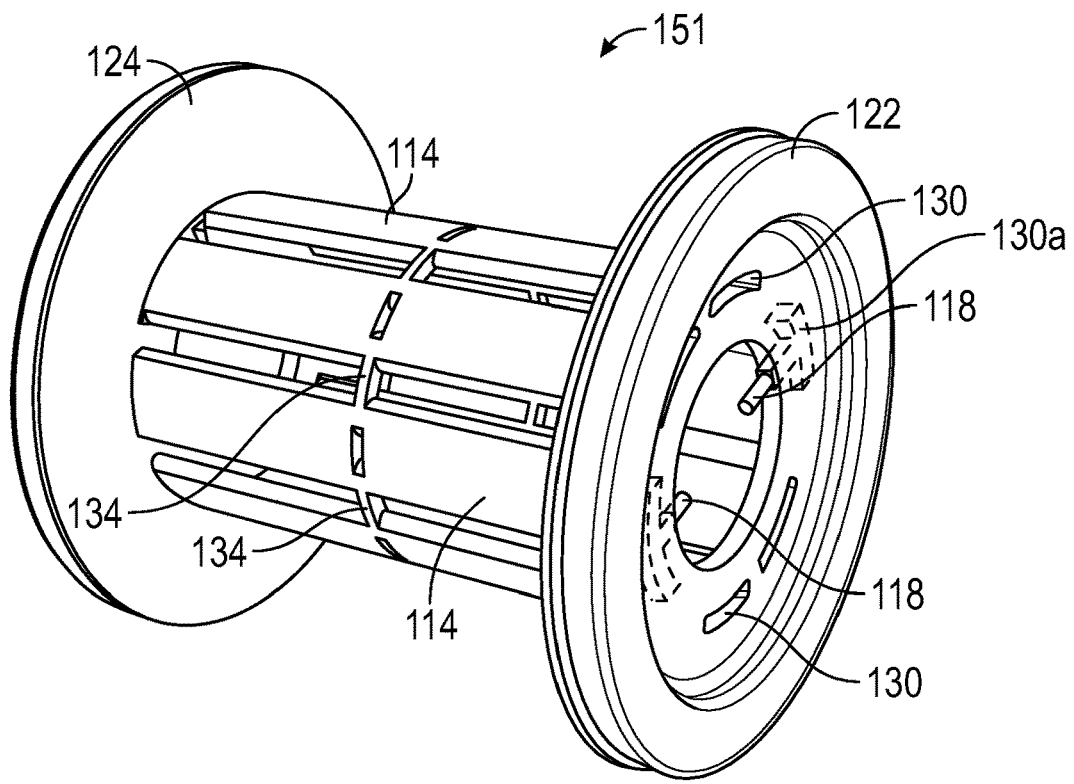
FIG. 19 schematically illustrates an isometric view of end rings and a rotor jacket of a rotor in accordance with another aspect of the present disclosure.

With reference to FIG. 19, the rotor jacket 151 may include interconnection channels 154 at the midpoint of the length of the rotor 104.

Figure 20:
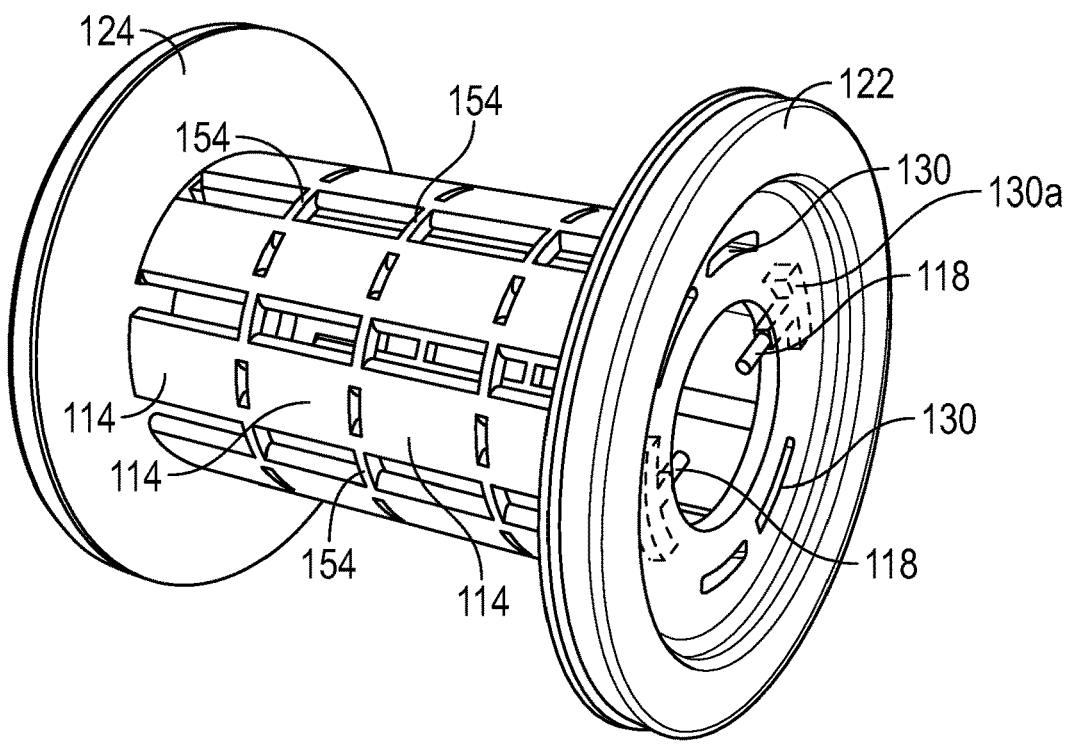
FIG. 20 schematically illustrates an isometric view of end rings and a rotor jacket of a rotor in accordance with another aspect of the present disclosure.

With reference to FIG. 20, the rotor jacket 151 may include three rows of interconnection channels 154 spaced apart from each other.

With reference to FIG. 21, FIG. 21A, FIG. 22, and FIG. 23, the first end ring 122 and/or the second end ring 124 defines an indentation 180 that is spaced apart from the outlet 120. The indentation 180 may be at different locations. In the embodiment shown in FIG. 21A, the distance OLD1 and OLD2 are from the longitudinal axis LX to the outlet 120. The difference between OLD1 and OLD2 is between 01 h and 0.9 h.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A permanent magnet electric motor, comprising:
a shaft extending along a longitudinal axis, wherein the shaft defines a shaft jacket extending along a first direction, the first direction is parallel to the longitudinal axis, the shaft jacket is sized to receive a coolant, and the shaft is rotatable about the longitudinal axis;
a rotor mounted on the shaft such that the rotor is rotatable concomitantly with the shaft about the longitudinal axis;
a stator disposed about the rotor, wherein the stator remains stationary relative to the rotor;
wherein the rotor defines a plurality of longitudinal channels extending in the first direction, each of the plurality of longitudinal channels is in fluid communication with the shaft jacket to allow the coolant to flow from the shaft jacket to the longitudinal channel to cool the rotor;
wherein the longitudinal channels are part of a rotor jacket;
wherein the rotor jacket further includes a plurality of inlets fluidly interconnecting the shaft jacket and the plurality of the longitudinal channels to allow the coolant to flow from the shaft jacket to the plurality of longitudinal channels through the plurality of inlets;
wherein the rotor jacket includes an inner edge and an outer edge opposite the inner edge, and the inner edge is spaced from the outer edge along a second direction, and the second direction is perpendicular to the first direction;
wherein the rotor jacket further includes a plurality of outlets each in fluid communication with the plurality of longitudinal channels to allow the coolant to flow from the plurality of longitudinal channels to the plurality of outlets to exit the rotor; and
wherein an outer edge of outlet is below the outer edge of rotor jacket and each of the plurality of outlets is closer to the inner edge than to the outer edge of the rotor jacket to hinder the coolant from flowing back into the plurality of inlets toward the shaft jacket, thereby maximizing a time that the coolant resides inside the plurality of longitudinal channels and maximizing heat transfer between the rotor and the coolant.

2. The permanent magnet electric motor of claim 1, wherein the rotor includes a plurality of permanent magnets, each of the longitudinal channels has a trapezoidal shape to maximize heat transfer between the coolant flowing through the plurality of longitudinal channels and the plurality of permanent magnets.

3. The permanent magnet electric motor of claim 2, wherein the rotor jacket includes a first longitudinal end and a second longitudinal end along the first direction, and the plurality of outlets is located at the first longitudinal end and the second longitudinal end.

4. The permanent magnet electric motor of claim 3, wherein the plurality of inlets is located at a longitudinal midpoint between the first longitudinal end and the second longitudinal end to evenly distribute the coolant in the plurality of longitudinal channels, a distance from the first longitudinal end to the longitudinal midpoint is equal to a distance from the longitudinal midpoint to the second longitudinal end.

5. The permanent magnet electric motor of claim 4, wherein the rotor defines a plurality of interconnection channels, each of the plurality of interconnection channels directly interconnects an adjacent pair of the plurality of longitudinal channels to direct the coolant from one of the plurality of longitudinal channels to another one of the plurality of the longitudinal channels, the shaft jacket is entirely disposed inside the shaft, each of the plurality of longitudinal channels is entirely disposed inside the rotor, and each of the plurality of interconnection channels is entirely disposed inside the rotor.

6. The permanent magnet electric motor of claim 5, further comprising a first end ring and a second end ring opposite the first end ring, wherein the rotor includes a first rotor end and a second rotor end opposite to the first rotor end, the first rotor end is spaced apart from the second rotor end along the first direction, the first end ring is attached to the rotor at the first rotor end, and the second end ring is attached to the rotor at the second rotor end.

7. The permanent magnet electric motor of claim 6, wherein the permanent magnet electric motor includes a plurality of pole pieces, each of the plurality of longitudinal channels has a first lateral end and a second lateral end opposite the first lateral end, each of the plurality of longitudinal channels is shaped as an arc extending from the first lateral end to the second lateral end, each of the plurality of longitudinal channels has a central angle, the central angle of each of the plurality of longitudinal channels is subtended by the arc extending from the first lateral end to the second lateral end, and the central angle of each of the plurality of longitudinal channels is less than $$\frac{360°}{M} \times 0.95 \text{ degrees,}$$

and M is a number of pole pieces.

8. The permanent magnet electric motor of claim 7, wherein the rotor has a center, the rotor has an innermost rotor radius, the innermost rotor radius is defined from the center of the rotor to an innermost rotor edge of the rotor, each of the plurality of longitudinal channels defines an innermost longitudinal-channel end and an outermost longitudinal-channel end opposite the innermost longitudinal-channel end, the outermost longitudinal-channel end of each of the plurality of longitudinal channels is farther from the center of the rotor than the innermost longitudinal-channel end of each of the plurality of longitudinal channels, each of the plurality of longitudinal channels defines an innermost longitudinal-channel radius and an outermost longitudinal-channel radius, the innermost longitudinal-channel radius is defined from the center of the rotor to the innermost longitudinal-channel end, the innermost longitudinal-channel radius is equal to or greater than:

r+5 millimeters; and where r is the innermost rotor radius in millimeters.

9. The permanent magnet electric motor of claim 8, wherein the rotor defines an outermost rotor edge, the outermost rotor edge is opposite to the innermost rotor edge, the outermost rotor edge is farther from the center of the rotor than the innermost rotor edge, the rotor has an outermost rotor radius, the outermost rotor radius is defined from the center of the rotor to the outermost rotor edge of the rotor, each of the plurality of longitudinal channels defines an outermost longitudinal-channel radius, the outermost longitudinal-channel radius is defined from the center of the rotor to the outermost longitudinal-channel end of each of the plurality of longitudinal channels, and the outermost longitudinal-channel radius is equal to or less than:

R−10 millimeters; and where R is the outermost rotor radius in millimeters.

10. The permanent magnet electric motor of claim 9, wherein each of the plurality of longitudinal channels has a longitudinal-channel midpoint between the first lateral end and the second lateral end, a first longitudinal-channel distance from the first lateral end to the longitudinal-channel midpoint is equal to a second longitudinal-channel distance from the second lateral end to the longitudinal-channel midpoint, each of the plurality of interconnection channels has an interconnection-channel midpoint, each of the plurality of interconnection channels includes a first side-end and a second side-end opposite the first side-end, a first interconnection-channel distance from the first side-end to the interconnection-channel midpoint is equal to a second interconnection-channel distance from the second side-end to the interconnection-channel midpoint, each of the plurality of interconnection channels is shaped as an arc extending from the first side-end to the second side-end, each of the plurality of interconnection channels is angularly offset from an adjacent one of the plurality of longitudinal channels by an offset angle, the offset angle is defined from the longitudinal-channel midpoint of one of the plurality of longitudinal channels to the interconnection-channel midpoint of the adjacent one of the plurality of interconnection channels, and the offset angle is equal to:

$$\frac{360°}{M} \times 0.5$$

where M is the number of pole pieces.

11. The permanent magnet electric motor of claim 10, wherein each of the plurality of interconnection channels defines an innermost interconnection-channel end and an outermost interconnection-channel end that is opposite the innermost interconnection-channel end, the outermost interconnection-channel end of each of the plurality of interconnection channels is farther from the center of the rotor than the innermost interconnection-channel end of each of the plurality of interconnection channels, each of the plurality of interconnection channels defines an innermost interconnection-channel radius and an outermost interconnection-channel radius, the innermost interconnection-channel radius is defined from the center of the rotor to the innermost interconnection-channel end, the innermost interconnection-channel radius is equal to or greater than:

r+5 millimeters; and where r is the innermost rotor radius in millimeters.

12. The permanent magnet electric motor of claim 11, wherein each of the plurality of interconnection channels defines an outermost interconnection-channel radius, the outermost interconnection-channel radius is defined from the center of the rotor to the outermost interconnection-channel end of each of the plurality of interconnection channels, and the outermost longitudinal-channel radius is equal to or less than:

R−10 millimeters; and where R is the outermost rotor radius in millimeters.

13. The permanent magnet electric motor of claim 12, wherein each of the plurality of interconnection channels is shaped as an arc extending from the first side-end to the second side-end, each of the plurality of interconnection channels has a central angle, the central angle of each of the plurality of interconnection channels is subtended by the arc extending from the first side-end to the second side-end, and the central angle of each of the plurality of interconnection channels is less than $$\frac{360°}{M} \times 0.95 \text{ degrees,}$$

and M is a number of pole pieces.

14. The permanent magnet electric motor of claim 13, wherein the rotor defines a plurality of permanent-magnet slots, each of the plurality of permanent-magnet slots is sized to receive a permanent magnet, each of the plurality of permanent-magnet slots has an innermost slot point, the innermost slot point is disposed at a location of each of the permanent-magnet slots that is closest to the center of the rotor, and a distance from the outermost interconnection-channel end to the innermost slot point is between three and eight millimeters.

15. The permanent magnet electric motor of claim 14, wherein each of the permanent magnet slots defines a lateral slot end, each of the plurality of longitudinal channels has an outermost side channel edge, and a distance from the outermost side channel edge to the lateral slot end is greater than three millimeters.

16. The permanent magnet electric motor of claim 15, wherein each of the plurality of interconnection channels has a first end and a second end opposite the first end, the first end of each of the plurality of interconnection channels is spaced apart from the second end of each of the plurality of interconnection channels along the first direction, each of the plurality of interconnection has a length defined from the first end to the second end of each of the plurality of interconnection channels, the length of the each of the plurality of interconnection channels is between three millimeters and five millimeters.

17. The permanent electric motor of claim 16, wherein the outer edge of the outlet is below the outer edge of the rotor jacket, the distance from the outer edge of the rotor jacket to the outer edge of the outlet has an upper limit and a lower limit, the upper limit is equal to the innermost rotor radius plus 0.7 times h, where h is a distance from inner edge to the outer edge of the rotor jacket, and the lower limit is equal to the innermost rotor radius plus 0.1 times h.

18. A permanent magnet electric motor, comprising:
a shaft extending along a longitudinal axis, wherein the shaft defines a shaft jacket extending along a first direction, the first direction is parallel to the longitudinal axis, the shaft jacket is sized to receive a coolant, and the shaft is rotatable about the longitudinal axis;
a rotor mounted on the shaft such that the rotor is rotatable concomitantly with the shaft about the longitudinal axis;
a stator disposed about the rotor, wherein the stator remains stationary relative to the rotor;
wherein the rotor defines a plurality of longitudinal channels extending in the first direction, the first direction is parallel to the longitudinal axis, each of the plurality of longitudinal channels is in fluid communication with the shaft jacket to allow the coolant to flow from the shaft jacket to the longitudinal channel to cool the rotor;
wherein the longitudinal channels are part of a rotor jacket;
wherein the rotor jacket further includes a plurality of inlets fluidly interconnecting the shaft jacket and the plurality of the longitudinal channels to allow the coolant to flow from the shaft jacket to the plurality of longitudinal channels through the plurality of inlets;
wherein the rotor jacket includes an inner edge and an outer edge opposite the inner edge, and the inner edge is spaced from the outer edge along a second direction, and the second direction is perpendicular to the first direction;
wherein the rotor jacket further includes a plurality of outlets each in fluid communication with the plurality of longitudinal channels to allow the coolant to flow from the plurality of longitudinal channels to the plurality of outlets to exit the rotor; and
wherein an outer edge of outlet is below the outer edge of rotor jacket and each of the plurality of outlets is closer to the inner edge than to the outer edge of the rotor jacket to hinder the coolant from flowing back into the plurality of inlets toward the shaft jacket, thereby maximizing a time that the coolant resides inside the plurality of longitudinal channels maximizing heat transfer between the rotor and the coolant; and
wherein the permanent magnet electric motor includes a plurality of pole pieces, each of the plurality of longitudinal channels has a first lateral end and a second lateral end opposite the first lateral end, each of the plurality of longitudinal channels is shaped as an arc extending from the first lateral end to the second lateral end, each of the plurality of longitudinal channels has a central angle, the central angle of each of the plurality of longitudinal channels is subtended by the arc extending from the first lateral end to the second lateral end, and the central angle of each of the plurality of longitudinal channels is less than $$\frac{360°}{M} \times 0.95 \text{ degrees,}$$

and M is a number of pole pieces.

19. The permanent magnet electric motor of claim 18, wherein each of the plurality of longitudinal channels has a longitudinal-channel midpoint between the first lateral end and the second lateral end, a first longitudinal-channel distance from the first lateral end to the longitudinal-channel midpoint is equal to a second longitudinal-channel distance from the second lateral end to the longitudinal-channel midpoint, each of the plurality of interconnection channels has an interconnection-channel midpoint, each of the plurality of interconnection channels includes a first side-end and a second side-end opposite the first side-end, a first interconnection-channel distance from the first side-end to the interconnection-channel midpoint is equal to a second interconnection-channel distance from the second side-end to the interconnection-channel midpoint, each of the plurality of interconnection channels is shaped as an arc extending from the first side-end to the second side-end, each of the plurality of interconnection channels is angularly offset from an adjacent one of the plurality of longitudinal channels by an offset angle, the offset angle is defined from the longitudinal-channel midpoint of one of the plurality of longitudinal channels to the interconnection-channel midpoint of the adjacent one of the plurality of interconnection channels, and the offset angle is equal to:

$$\frac{360°}{M} \times 0.5$$

where M is the number of pole pieces.

20. The permanent magnet electric motor of claim 19, wherein each of the plurality of interconnection channels is shaped as an arc extending from the first side-end to the second side-end, each of the plurality of interconnection channels has a central angle, the central angle of each of the plurality of interconnection channels is subtended by the arc extending from the first side-end to the second side-end, and the central angle of each of the plurality of interconnection channels is less than $$\frac{360°}{M} \times 0.95 \text{ degrees,}$$

and M is a number of pole pieces.

* * * * *